United States Patent
Chatow et al.

(10) Patent No.: US 9,773,168 B2
(45) Date of Patent: Sep. 26, 2017

(54) IDENTIFICATION MARK WITH A PREDETERMINED COLOR DIFFERENCE

(75) Inventors: Ehud Chatow, Palo Alto, CA (US); Nathan Moroney, Palo Alto, CA (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 30 days.

(21) Appl. No.: 14/347,329

(22) PCT Filed: Jan. 31, 2012

(86) PCT No.: PCT/US2012/023370
§ 371 (c)(1),
(2), (4) Date: Mar. 26, 2014

(87) PCT Pub. No.: WO2013/115801
PCT Pub. Date: Aug. 8, 2013

(65) Prior Publication Data
US 2014/0334723 A1  Nov. 13, 2014

(51) Int. Cl.
G06K 7/00 (2006.01)
G06K 19/00 (2006.01)
(Continued)

(52) U.S. Cl.
CPC ....... *G06K 9/00577* (2013.01); *G06K 7/1417* (2013.01); *G06K 9/4652* (2013.01); *G06K 19/0614* (2013.01); *G06K 19/06028* (2013.01); *G06K 19/06037* (2013.01); *G06K 19/14* (2013.01); *G06T 7/90* (2017.01); *G06K 2009/0059* (2013.01); *G06T 2207/30108* (2013.01)

(58) Field of Classification Search
CPC .. G06K 9/00577; G06K 19/14; G06K 9/4652; G06K 19/06; G06K 19/0614; G06K 7/10; G06K 9/18; G06K 2009/0059; G06T 7/408; G06T 2207/30108
USPC .......................................... 382/165
See application file for complete search history.

(56) References Cited

U.S. PATENT DOCUMENTS 6,736,322 B2 * 5/2004 Gobburu et al. ........ 235/462.46
8,868,902 B1 * 10/2014 Brown ................. G06Q 20/322
713/155
(Continued)

FOREIGN PATENT DOCUMENTS

WO  WO-2008074917 A1  6/2008

OTHER PUBLICATIONS

Parikh, D.; Jancke, G., "Localization and Segmentation of a 2D High Capacity Color Barcode," Applications of Computer Vision, 2008. WACV 2008. IEEE Workshop on , vol., No., pp. 1,6, Jan. 7-9, 2008. [Online; accessed Apr. 28, 2015]http://ieeexplore.ieee.org/stamp/stamp.jsp?tp=&arnumber=4544033&isnumber=4543991.*
(Continued)

*Primary Examiner* — Utpal Shah
(74) *Attorney, Agent, or Firm* — Fabian VanCott (57) ABSTRACT

An identification mark may have a calibration color, a predetermined authentication color, and a predetermined difference between the calibration color and the predetermined authentication color that is associated with a product; and a visual code with a mechanism that identifies the predetermined difference.

13 Claims, 6 Drawing Sheets

(51) Int. Cl.

| | | |
|---|---|---|
| *G06K 9/00* | (2006.01) | |
| *G06K 7/14* | (2006.01) | |
| *G06K 19/06* | (2006.01) | |
| *G06K 9/46* | (2006.01) | |
| *G06K 19/14* | (2006.01) | |
| *G06T 7/90* | (2017.01) | |

(56) References Cited

U.S. PATENT DOCUMENTS

| | | | |
|---|---|---|---|
| 2005/0023354 A1* | 2/2005 | Sali | G06K 7/14 235/462.04 |
| 2005/0150964 A1 | 7/2005 | Lo | |
| 2006/0027660 A1* | 2/2006 | Ming | G06K 19/06037 235/462.04 |
| 2006/0202470 A1* | 9/2006 | Simske | G06K 19/06037 283/74 |
| 2007/0065004 A1 | 3/2007 | Kochi et al. | |
| 2007/0119940 A1 | 5/2007 | Futamura et al. | |
| 2007/0152032 A1 | 7/2007 | Tuschel et al. | |
| 2007/0217692 A1* | 9/2007 | Newcomer | G06K 9/00469 382/229 |
| 2007/0291988 A1 | 12/2007 | Karimov et al. | |
| 2008/0116276 A1 | 5/2008 | Lo | |
| 2009/0148037 A1 | 6/2009 | Moriyama et al. | |
| 2011/0258130 A1 | 10/2011 | Grabiner et al. | |

OTHER PUBLICATIONS

Microsoft Research, "High Capacity Color Barcodes," http://research.microsoft.com/projects/hccb/, Jan. 16, 2009, [Online; accessed Apr. 28, 2015].*

M. Querini, A. Grillo, A. Lentini, and G. Italiano, "2D color barcodes for mobile phones," International Journal of Computer Science and Applications (IJCSA), vol. 8, No. 1, pp. 136-155, 2011. [Online; accessed Apr. 28, 2015] http://www.proceedings2010.imcsit.org/pliks/79.pdf.*

Jancke, Gavin. "High-Capacity Color Bar Code." Field Notes. Oct. 2008. [Online:Accessed Apr. 28, 2015.] https://technet.microsoft.com/en-us/magazine/2008.10.fieldnotes.aspx.*

Lee, Roger. Title. publication place: Springer Science & Business Media, 2010. [Online: Accessed Apr. 28, 2015.]http://www.springer.com/us/book/9783642154041.*

Simske, Steven. "Revenge of the Physical—Mobile Color Barcode Solutions to Security Challenges." HP Tech Reports, Jan. 21, 2010. Accessed Dec. 9, 2015. http://www.hpl.hp.com/techreports/2010/HPL-2010-7.pdf.*

Lee, Roger. Computer and Information Science 2010. Chennai India: Springer-Verlag Berlin Heidelberg, 2010. Accessed Dec. 17, 2015. http://www.springer.com/us/book/9783642154041.*

Simske, Steven. "Effect of Copying and Restoration on Color Barcode Payload Density." HP Tech Reports, Aug. 6, 2009. Accessed Dec. 9, 2015 http://www.hpl.hp.com/techreports/2009/HPL-2009-177.pdf.*

* cited by examiner

IDENTIFICATION MARK WITH A PREDETERMINED COLOR DIFFERENCE

BACKGROUND

Counterfeiting in many parts of the world is a serious issue for many industries. Unfortunately, counterfeiting occurs along the entire distribution chain from the manufacture to the end user. Counterfeited products are usually inferior and, in the case of pharmaceuticals, dangerous for consumption.

Product suppliers have attempted to address this issue by placing watermarks, holograms, specialized inks, or other specialized marks that are hard to replicate on the products' packing to give an end user confidence that they are buying authentic products. However, these specialized marks are often expensive and are not regulated.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The present specification describes principles including, for example, an identification mark. Examples of such an identification mark may include identification marks with a calibration color, a predetermined authentication color, a predetermined difference allowed between a coordinate of the authentication color and coordinates of the calibration colors, and a visual code with a mechanism that identifies the predetermined difference.

In the following description, for purposes of explanation, numerous specific details are set forth in order to provide a thorough understanding of the present systems and methods.

It will be apparent, however, to one skilled in the art that the present apparatus, systems and methods may be practiced without these specific details. Reference in the specification to "an example" or similar language means that a particular feature, structure, or characteristic described is included in at least that one example, but not necessarily in other examples.

Figure 1:
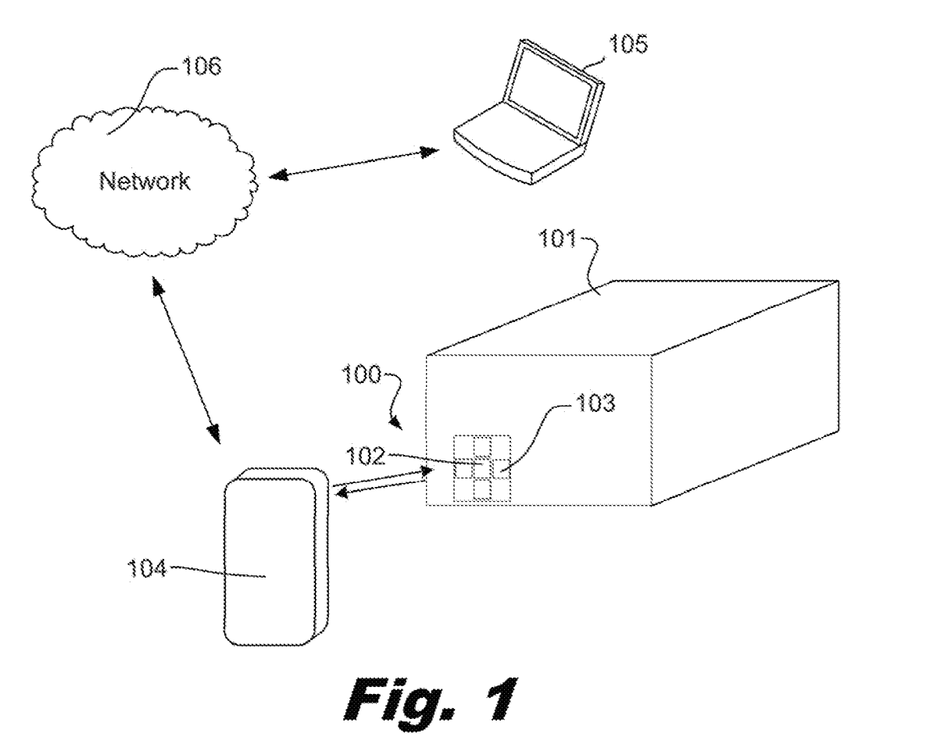
FIG. 1 is a diagram of an illustrative identification mark associated with a product, according to principles described herein.

FIG. 1 is a diagram of an illustrative identification mark (100) associated with a product, according to principles described herein. An image may be taken of the identification mark (100), and information derived from the image may be used to confirm the product's source. In the example of FIG. 1, information about the image is sent over a network (106), such as the internet, to a network device (105), such as one that provides a cloud service, for processing and/or authentication. The network device (105) may notify an operator of a field device (104) that the identification mark (100) or the product's source is authentic. In some examples, the field device (104) determines authenticity locally.

The product may be placed within packaging (101) for shipping, storage, display, or combinations thereof. An identification mark (100) may be secured to the packaging (101) and viewable to a buyer, who may be an end user, a distributor, a wholesaler, other entity, or an individual along the distribution chain. In the example of FIG. 1, the identification mark (100) is affixed to the outside of the packaging. However, in some examples, an identification mark may be affixed to the inside of the packaging to prevent tampering.

The identification mark (100) may have a visual code (102) and plurality of colors (103). The visual code (102) may have an encrypted message, a network resource identifier, a security mechanism, information about the colors, information about the product, or combinations thereof. Two of the colors may be calibration colors and another color may be predetermined authentication color. The differences between the calibration colors and the authentication color may be predetermined, and the visual code may contain information about the predetermined color difference allowed between the measured authentication color coordinates and the predefined coordinates or provide (102) data that directs a buyer to information about the predetermined color difference.

An image of the identification mark (100) may be captured with a field device (104), such as a phone, camera, mobile device, or other device that takes images. The field device (104) may be a standard device that a buyer may possess, such as a cell phone. In some examples, a mobile device has a program or application that reads, interprets, processes, sends, or combinations thereof the image's data. Also, the field device (104) may be a fixture at a location such as an international customs checkpoint, warehouse, market place, or combinations thereof. The field device (104) may also be part of an automobile for land use, water use, air use, or combinations thereof.

The field device (104) may capture an image of the identification mark (100) and derive information from the image that may be sent to another location for processing or the information may be processed in the field device (104) itself. In some examples, the information may be sent as digital information. In some examples, the field device (104) wirelessly transmits the digital image to a network device (105). The network device (105) may host a website, a website cache, a program, or combinations thereof that may process the information. In examples, where the network device (105) is associated with a website, the field device operator may instruct the field device to send the information to the website or network device. In other examples, the field device executes a program that contains an address of a website and/or a network device (105) to process the information.

The network device (105) may be a device in a network (106) that is capable of communicating with the field device. For example, the network device may be part of a network from the following non-exhaustive list of local area networks, wide area networks, the internet, virtual private networks, corporate computer networks, government computer networks, wireless networks, telecommunication networks, cloud networks, data center networks, or combinations thereof. The field device (104) may have a physical connection to the network (106) or the field device may interact with the components of the network (106) wirelessly. The field device (104) may communicate with components of the network (106) with mechanisms from the following non-exhaustive list of electromagnetic waves, optics, radio, Wi-Fi, Bluetooth, short-hop, satellites, cables, or combinations thereof. In some examples, the network device is located within a network cloud where data storage services are provided. In some examples, a cloud service is used to generate the identification mark and provide the code confirmation.

The information may include a digital image of the identification mark, portions of a digital image, information derived from a digital image, interpretations of the visual code, identified color characteristics of any of the colors, identified differences between the colors, or combinations thereof. The information may include processed data, partially processed data, raw data, or combinations thereof. The information may also include data about the location where the image was taken, which may be ascertained from a location device, like a global positioning system of the field device; a manual input from a field device operator; an assigned location of the field device; or combinations thereof. The information may also include a time stamp of when the image was taken. Further, the information may also include data about when the image was taken like weather conditions, movement of the field device, orientation of the field device, the amount of light present, elevation, ambient humidity, ambient temperature, atmospheric pressure, wind conditions, position of the sun, or combinations thereof. This information may be used to factor into the colors contained in the image.

The visual code (102) may contain a network resource identifier that contains the address of the network device (105) and/or website. The field device (104) may recognize the network resource identifier and send the information to the network resource. In other examples, the field device (104) may send the information to a centralized website that may derive a network resource identifier from the information and resend the information to the network device (105).

The field device (104) or network device (105) may determine the differences between the calibration color and the predetermined authentication color. In some examples, the field device (104) will process the difference between the colors and transmit the difference to the network device (105). The network device (105) may determine the acceptable difference range of the colors. The network device (105) or field device (104) may determine the difference by looking up a reference table that contains an identifier of the identification mark that lists the acceptable range. In some examples, the network device may interpret the data in the visual code (102) to determine the acceptable range and/or predetermined color difference. The network device (105) may compare the difference received from the field device (104) or processed by the network device (105) against the acceptable range. If the difference falls within the acceptable range, the network device (104) or the field device (104) may notify the operator of the field device (104) that the source of the product and/or the identification mark is authentic.

In some examples, the field device (104) may request the reference tables from the network device (105), and process the information locally. The reference tables may be updated to the field device (104) periodically, prior to processing the information, while processing the information, or combinations thereof.

Figure 2:
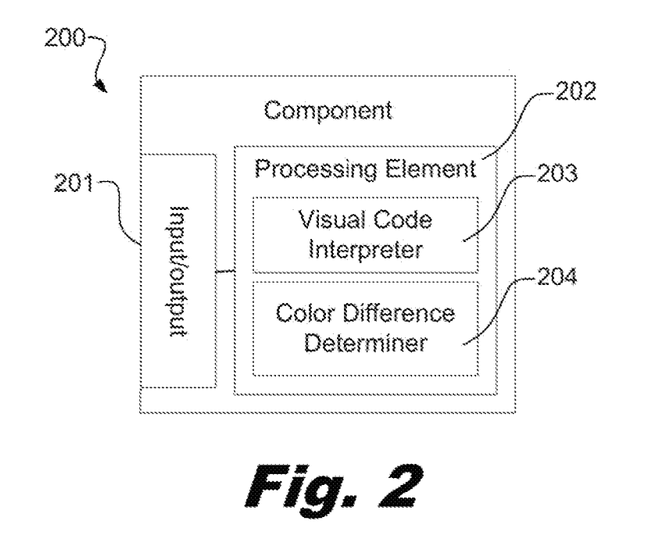
FIG. 2 is a diagram of an illustrative component of a device, according to principles described herein.

FIG. 2 is a diagram of an illustrative component (200) of a device, according to principles described herein. The component (200) may be incorporated into field device or a network device. The component (200) may have an input/output (201) to receive information about an image of an identification mark and/or to send notifications. A processing element (202) may have a visual code interpreter (203) and a color difference determiner (204). The visual code interpreter (203) may read the portion of the information about the visual code, and the color difference determiner (204) may read the portion of the information about the colors' differences.

Information about the image may be received by the input/output (201). In some examples, the information is sent to the input/output (201) as digital information. In alternative examples, the information may be sent to the input/output (201) as an analog signal.

The visual code interpreter (203) may read the message of the visual code. The message may include the predetermined color difference range, an address to a location that contains the predetermined color difference range, a password, a token, or other security mechanism to gain access to such a location.

In some examples, a color difference reference table may be stored within the device. In other examples, such a reference table may be stored elsewhere, but the device may gain access to the reference table. The device may have a cache of a reference table that is periodically updated. In some examples, a reference table is updated prior to, or during the processing of the image's information. In some examples, the device requests information from the reference table associated with an identifier of the identification mark.

The color difference determiner (204) may determine if the differences between the colors fall within an acceptable difference range. In some examples, the colors are provided to the color difference determiner (204), and the determiner (204) determines the difference of the colors. In some examples, the determiner (204) may determine the colors based on the image's information. In some examples, the difference is provided to the determiner (204) and the determiner compares the difference with the acceptable range.

The device may further have a notifier to notify a field device operator that the difference falls inside or outside of the predetermined color difference range.

The device may also have a reference table or have access to a reference table that contains other information about the identification mark. For examples, the tables may contain information about which products are associated with the identification mark. In some examples, if the identification mark indicates that the product is for a product other than the product within the packaging to which the identification mark is affixed, the buyer may realize that some meddling may have occurred. A look up table may also contain a date of when a product was shipped or manufactured.

Further, a reference table may also include the geographic area to which the identification mark's products were shipped. If location information associated with the image indicates that the image was taken in a location outside of the region to which the products were shipped, the device may send a non-confirmatory notification to the field device operator.

The reference tables may also include information about similar identification marks that were produced and where they were shipped.

In some examples, the reference tables may be updated to reflect a history of events that have occurred to the identification mark, such when it was scanned, where it was scanned, whether the products where bought, or combinations thereof. This information may be factored into whether the device sends an authentication notification or a non-confirmatory notification.

Figure 3:
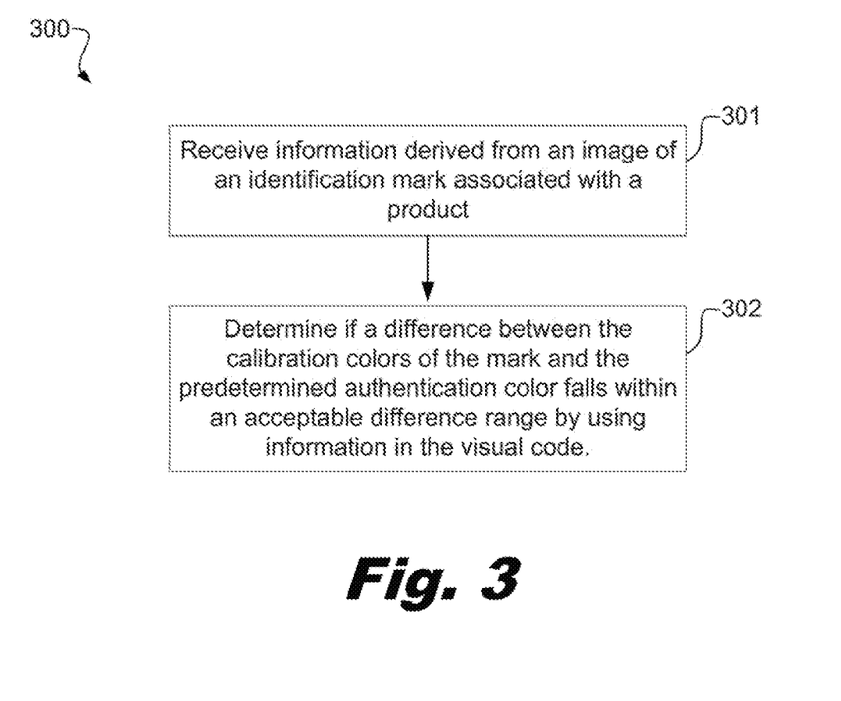
FIG. 3 is a flowchart of an illustrative method for confirming an identity of a source, according to principles described herein.

FIG. 3 is a flowchart of an illustrative method (300) for confirming an identity of a source, according to principles described herein. The method (300) may include receiving (301) information derived from an image of an identification mark associated with a product and determining (302) if a difference between the calibration colors and the predetermined authentication color falls within an acceptable difference range by using information in the visual code.

In some examples, receiving the information may be performed by a component of a field device or a component of a network device. In examples, where a field device receives the information, the field device has a camera that captures an image of the identification mark and sends information derived from the image to a component of the field device.

In some examples, the method may also include notifying a field device that the product source is authentic when the difference falls within the acceptable difference range.

Figure 4:
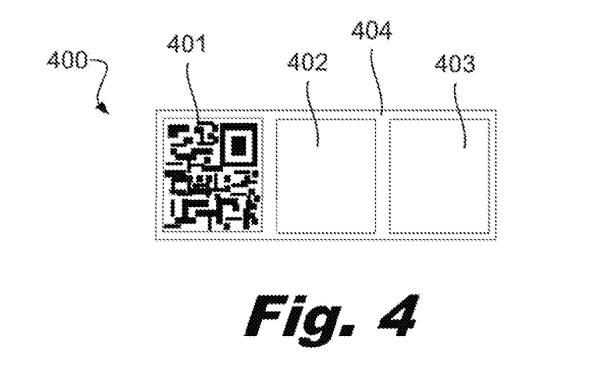
FIG. 4 is a diagram of an illustrative identification mark, according to principles described herein.

FIG. 4 is a diagram of are illustrative identification mark (400), according to principles described herein. The identification mark (400) includes a visual code (401), a calibration color patch (402), and a predetermined authentication color patch (403). In this example, the color of substrate (404) or material upon which the predetermined authentication color is printed may provide a second calibration color.

The visual code (401) may be any code that may be interpreted visually. In the example of FIG. 4, the visual code (401) has a matrix dimensional bar code, such as a Quick Response (OR) code. However, the visual code (401) may include other machine-readable codes. The visual code (401) may include a code that utilizes fine width, line spacing, shape spacing, dots, hexagons, rectangles, or other geometric shapes. In some examples, words and numbers may be used.

The visual code (401) may include a message that includes information about how many similar identification marks exists; the geographic location where the associated products were shipped; the product associated with the identification mark (400), such as age, type, weight, and/or manufacturer; the predetermined color difference between the calibration colors and the predetermined authentication color, the calibration color, the predetermined authentication color, and combinations thereof.

In some examples, the visual code (401) has a message that includes the color difference between the colors. In such an example, the field device may determine the colors of the calibration color and the predetermined authentication color, determine the difference thereof, and determine whether the difference falls within a difference range identified in the message of the visual code (401). In such an example, the field device may determine authenticity locally.

In other examples, the visual code (401) may contain a network resource identifier to a network device and/or website that contains information about the product, the color patches, the differences between the colors, or combinations thereof. For example, field device may recognize that the image of the visual code (401) includes an address for a website and/or a network device. In such an example, the field device may send the information to that address to determine authenticity. In some examples, the field device may look up or request information from a network device and/or website to determine authenticity.

The message of the visual code (401) may be overt, covert, or combinations thereof. For example, a serial number may identify the identification mark (400), which may be looked up on a website that contains the predetermined color difference assigned to that number. In some examples, words may overtly state the predetermined color difference. However, in some examples, the message is covert such that a program is needed to interpret the message.

The calibration colors and the predetermined authentication color may be created in La*b* space; an additive color mode, such as a red, green, and blue color model; a subtractive color mode, such as cyan, magenta, yellow, and key color model; other color system, or combinations thereof. The predetermined authentication color may have at least one color characteristic within a predetermined tolerance that differs from the calibration colors. In some examples, the predetermined difference may include color vector differences of predetermined magnitude and/or orientation. The differences or values of color characteristics may be used for authentication.

Also, the differences between the calibration colors and the predetermined authentication color may be overt, covert, or combinations thereof. The color differences may be distinguishable to the natural eye. In some examples, the differences are indistinguishable to the natural eye, but are distinguishable to a program of the field device and/or network device.

In some examples, a color difference may be visually apparent, but the precise predetermined color difference may be unknown to the natural eye. A buyer may see that the calibration color is a light blue and the predetermined authentication color is a dark red. The visual code (401) may contain a mechanism for the buyer to know whether this color difference is within an acceptable difference range or if the difference even pertains to the correct color parameter. Thus, the buyer may capture an image of the identification mark (400) to interpret the visual code (401) to discover the exact predetermined color difference or to discover where the color difference may be discovered. In some examples, if the color difference is within an acceptable range, the field device or network device may notify the buyer that the product or mark is authentic. However, in an example where the color difference is incorrect, the field device or network device may notify the buyer that the product or mark is not authenticated.

In some examples, both the color differences and the visual code's message are covert to the natural eye. In some examples, a program may be used to distinguish the colors as well as interpret the visual code (401).

In some examples, the visual code (401) may contain a password or other mechanism that gives access to a network device and/or website. In some examples, the visual code (401) has a cryptographic nonce, such as a number, word, message, or other symbol to gain access to information about the color differences.

While the calibration colors and the predetermined authentication color are depicted in the example of FIG. 4 on separate patches, other examples include a plurality of colors on a common patch. In some examples, the colors may gradual transition one to the other. While the patches in the example of FIG. 4 are depicted as squares, any shape or symbol may be used. For example, a non-exhaustive list of symbols may include letters, numbers, trademarks, logos, titles, names, pictures, figures, or combinations thereof. Also, a non-exhaustive list of shapes may include polygons, circles, lines, angled lines, symmetric shapes, asymmetric shapes, and combinations thereof.

Further, in some examples, the visual code (401), the calibration colors, and the predetermined authentication color may be positioned in predetermined locations with the identification mark (400). In some examples, the field device and/or network device may have recognition logic that identifies these components of the label regardless of their position.

In some examples, the identification mark (400) is printed directly onto the packaging or the product itself. In some examples, the identification mark (400) is a single label with an adhesive backing to affix to the packaging or product. In some examples, the identification mark (400) is a plurality of labels that may be affixed in any arrangement or in a predetermined arrangement. Further, the spacing of the identification mark's components may be variable. For example, the predetermined authentication colors and the calibration colors may be positioned at predetermined locations within the identification mark. In some examples, at least one of the colors in the identification mark may be repeated provided that printer has enough accuracy to reprint the exact same color or that the expected accuracy of a scanner may identify the colors as being the same.

Further, the visual code may include, in part or in whole, the arrangement of the colors themselves. For example, a specific sequence of colors in a clockwise or counterclockwise direction may provide a message. In an example, a color sequence from red-yellow-green-cyan-blue-magenta-red may represent a "one", and when that sequence is clockwise, it may represent "zero." In following such an example, a color sequence of red-yellow-red-yellow may represent a code of 1-0-1 since the sequence changes direction. These binary strings may be used to represent a variety of messages including which colors are calibration colors, which colors are predetermined authentication colors, if a color is a decoy color, a "no operation performed" message, an indication that another identification mark exists on the packaging, the location that the identification mark was shipped, another message, or combinations thereof. The sequence may be oriented in a circular orientation, a liner orientation, diagonal orientation, another orientation, or combinations thereof.

Figure 5:
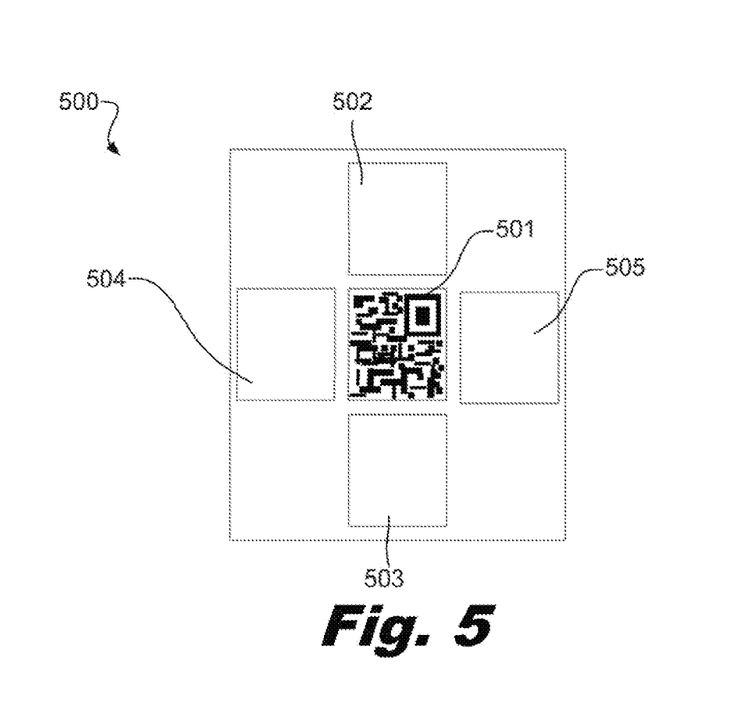
FIG. 5 is a diagram of an illustrative identification mark, according to principles described herein.

FIG. 5 is a diagram of an illustrative identification mark (500), according to principles described herein. In this example, a visual code (501) is located in the center of the identification mark (500). The mark (500) includes a first and a second calibration color (502, 503) and a first and a second predetermined authentication color (504, 505).

In the example of FIG. 5, the calibration colors (502, 503) may have a parameter with different values. The predetermined authentication colors (504, 505) may also have different values for the same color characteristics. In some examples to authenticate the product source, the colors differences between each calibration color (502, 503) and each predetermined authentication color (504, 505) are within predetermined ranges. For example, the first calibration color's difference from the first predetermined authentication color may be within a predetermined range, and another difference between a second calibration and the first predetermined authentication color may also be within another predetermined range. Also, the second predetermined authentication color may also be within other predetermined color difference ranges from the both the first and second calibration colors.

Further, in some examples, authentication is judged based on satisfying color differences between the first calibration color and the first predetermined authentication color, on satisfying color differences between the second calibration color and the second predetermined authentication color, or combinations thereof.

In some examples, the color difference between one of the calibration colors and one of the predetermined authentication colors is a difference of a first characteristic, while the difference between the other calibration colors and other predetermined authentication colors is a difference of a second color characteristic. In some examples, multiple predetermined differences of different characteristics exist between the combination of calibration colors and predetermined authentication colors.

In some examples, the identification mark may include decoy colors, which appear to be either a calibration color or a predetermined authentication color, but are not used to authenticate the product's source. These colors may be used to frustrate counterfeiting efforts.

Figure 6:
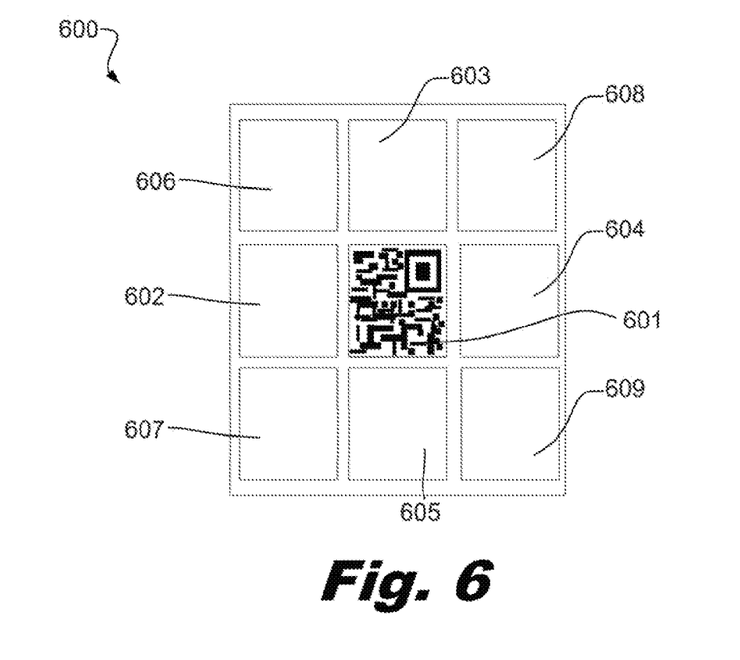
FIG. 6 is a diagram of an illustrative identification mark, according to principles described herein.

FIG. 6 is a diagram of an illustrative identification mark (600), according to principles described herein. In this example, the identification mark (600) has a visual code (601) and four calibration colors (602, 603, 604, 605), and four predetermined authentication colors (606, 607, 608, (609).

In this example, multiple combinations of differences between the calibration colors and the predetermined colors may be used for authentication. In some examples, authentication may involved color differences between specific pairs of colors. In some examples, authentication includes each predetermined authentication color having at least one predetermined difference with each calibration color.

While the difference between the calibration colors and predetermined colors are described with particular examples, any difference arrangement is foreseen and within the scope of the principles described herein. Further, while the positioning of the calibration colors, predetermined authentication colors, and visual codes are depicted in certain examples, any position arrangement is foreseen and within the scope of the principles described herein.

Figure 7:
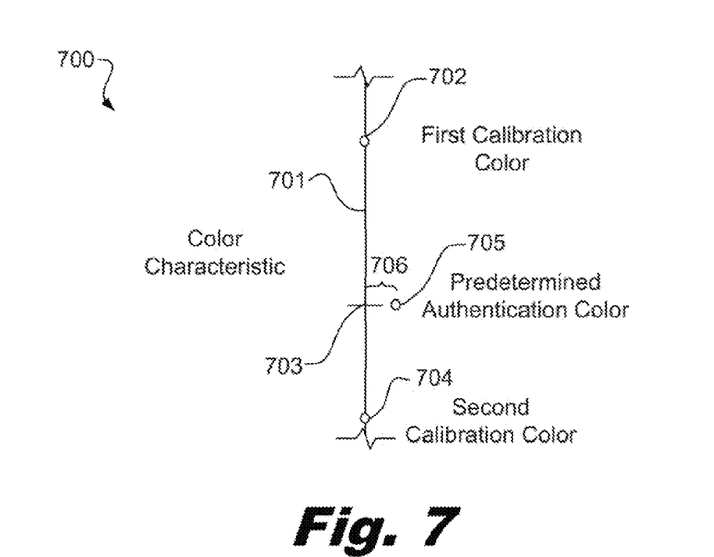
FIG. 7 is a diagram of a chart that illustrates a difference between calibration colors and a predetermined authorization color, according to principles described herein.

FIG. 7 is a diagram of a chart (700) that illustrates a difference between the calibration colors and a predetermined authorization color, according to principles described herein. An axis (701) within a three dimensional color space represents a continuum of values of a color characteristic. The calibration colors may be coordinates within the three dimensional color space that define the axis (701). The value of the color characteristic for the first calibration color may be identified at a first position (702) of the axis (701), while the value of the color characteristic for the second calibration color may be identified at a second position (704) on the axis (701). The predetermined authentication color may also be a coordinate (705) within the three dimensional color space. In this illustrated example, the predetermined authentication color's coordinate (705) resides a spatial error (706)

from location (703) of the axis (701). The spatial error (706) may be within an acceptable range identified with the visual code.

In some examples, the predetermined authentication color's coordinate (705) resides directly on the axis (701) defined by the calibration colors. In some examples, the predetermined authentication color's coordinate is intended to reside on the axis, but an acceptable difference range may allow for a spatial error within a predetermined distance from the axis in any direction. In some examples, the acceptable range is very narrow and allows for a small spatial error. In such examples, many potential countfeiters may not have access to printers with tight enough tolerances to meet such precise parameters or even identify such a range.

In some examples, the calibration colors have coordinates that are close together within the three dimensional color space and defines a relatively short axis that defines the direction in which the predetermined authentication color's coordinate may reside. The distance along the axis may determine the magnitude of the difference between either of the calibration colors and the predetermined authentication color. Further, the acceptable range of the spatial error may provide for an additional parameter for authentication. In some examples, the predetermined color difference and/or acceptable range includes the direction, the magnitude, the spatial error, or combinations thereof.

A non-exhaustive list of color characteristics that may be represented by the axis (701) includes hue, lightness, luminance, colorfulness, chroma, saturation, or combinations thereof. The color difference may include a single color characteristic difference. In other examples, a plurality of color characteristic differences may be used for authentication. In some examples, the differences may be subtle such that a first color characteristic difference is indiscernible to the natural eye, while a second color characteristic is discernible to the nature eye.

In some examples, the color characteristics may be affected by light exposure, humidity, temperature, or other external factors. However, in examples where the characteristic of both colors are affected by the same external factor by substantially the same amount, the field device or network device may still identify the predetermined difference between the colors. In some examples, the calibration colors are known to the device, and the device that determines the color characteristic values of the predetermined authentication color may account for the color changes due to these external factors.

In some examples, the difference between the calibration colors and the predetermined authentication color includes differences of multiple characteristics, and each of the predetermined differences may be involved for authentication.

In some examples, authentication requires that the predetermined difference between the colors is met and also that the difference is in the right direction. For example, in FIG. 7, the first calibration color has a color characteristic value that is greater than the color characteristic value of the predetermined authentication color. Thus, in some examples, the difference between the colors fall within the predetermined range and one of the color's color characteristic values may need to be greater than the other color's color characteristic's value for authentication.

Figure 8:
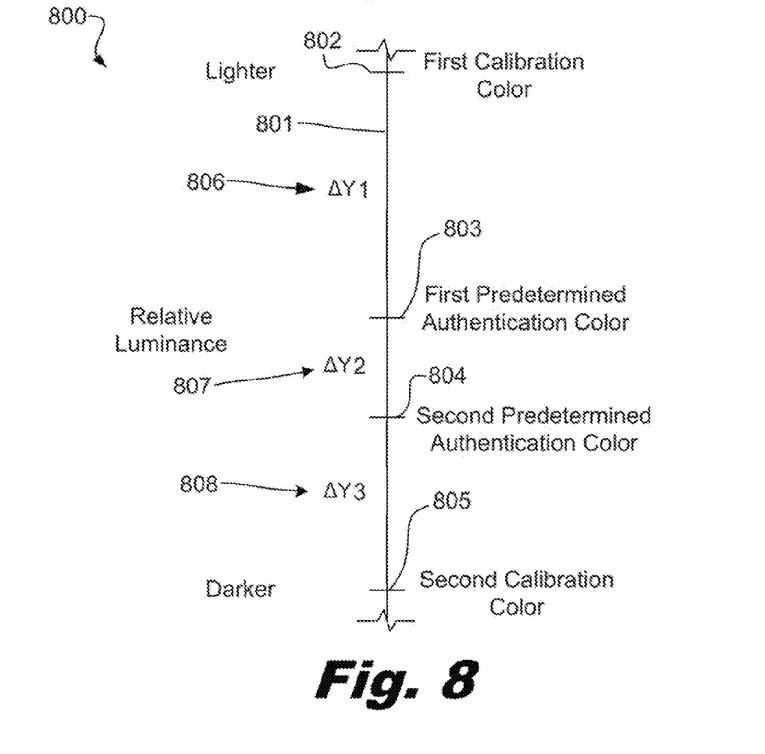
FIG. 8 is a diagram of a chart that illustrates a difference between calibration colors and a predetermined authorization color, according to principles described herein.

FIG. 8 is a diagram of a chart (800) that illustrates a difference between calibration colors and predetermined authorization colors, according to principles described herein. In the example of FIG. 8, the color characteristic is relative luminance, and each of a first calibration color, a second calibration color, a first predetermined authentication color, and a second predetermined authentication color have a relative value along an axis (801) representing luminance at a first, second, third, and forth position (802, 803, 804, 805).

A first, second, and third relative luminance difference (806, 807, 808) is depicted along the axis (801). Each of these differences (806, 807, 808) may be involved for authentication. However, other difference may also be involved. For example, while not illustrated on the chart, a difference between the first calibration color and the second predetermined authentication color may be involved as well.

Figure 9:
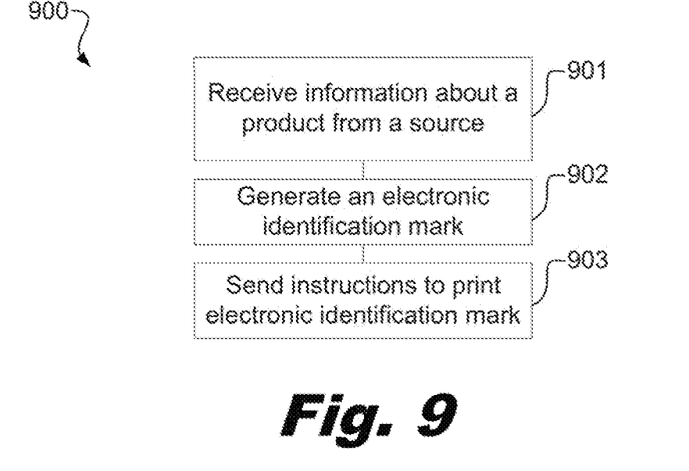
FIG. 9 is a flowchart of an illustrative method for creating an identification mark, according to principles described herein.

FIG. 9 is a flowchart of an illustrative method (900) for creating an identification mark, according to principles described herein. In this example, a device may receive (901) information about a product from the product's source or the source's agent. The source may request an identification mark according to the principles described herein. The information may include to where the product is intended to be shipped, the number of identification marks needed within that region, the time frame, and level of security desired.

In response to the request, the device may generate (90) electric version of the identification mark that includes details for the color differences and the visual code. The device may send (903) instructions to a printer to print the identification mark or send the instructions to a party with the capability to print an identification mark with sufficient precision to satisfy the accuracy specified in the instructions. The device may record the instructions in a reference table or register the instructions in an accessible location. In some examples, the printer or party may send an update to the device or accessible location with updated information about the identification mark. For example, the colors printed on the identification mark may have slightly different characteristic values once printed than originally specified by the device.

In such examples, the colors may be printed first and then scanned to determine the actual color characteristics. In examples where the visual code contains information about the colors and their relative differences, the visual code may be printed onto the identification mark after the actual printed color differences are determined. However, in some examples, the differences may be stored in an accessible location, where the differences may be updated if the printed color difference is other than originally instructed.

In some examples, the color gamut used for the calibration colors and predetermined authentication colors may be broad or narrow. In some examples, a more expansive color gamut may allow for a greater number of combinations and for a tougher identification mark to mimic. Special inks may be used to print the colors and/or may include forensic tags or metallic mixed inks.

In some examples, the colors used in the identification mark may belong to a predetermined set of finite colors to exclude colors that may be prone to printing errors. This allowable finite set of colors may be for all colors used in any of the identification marks or for specific printers. For example, certain printers may halftone certain colors poorly or in unpredictable manners. In some examples, certain printers may have difficulty printing certain colors with accuracy. Thus, the device may generate an identification mark with colors from this finite group of colors or take into account the printer that the device will send the identification mark for printing. In some examples, the device may merely exclude problematic colors without limiting itself to a finite set of available colors.

Further, the device may generate identification marks that use colors or combinations of colors that tend to authenticate easily. Further, specific devices may have an ability to distinguish between certain colors easier than others; therefore, the device may strictly use these colors.

Figure 10:
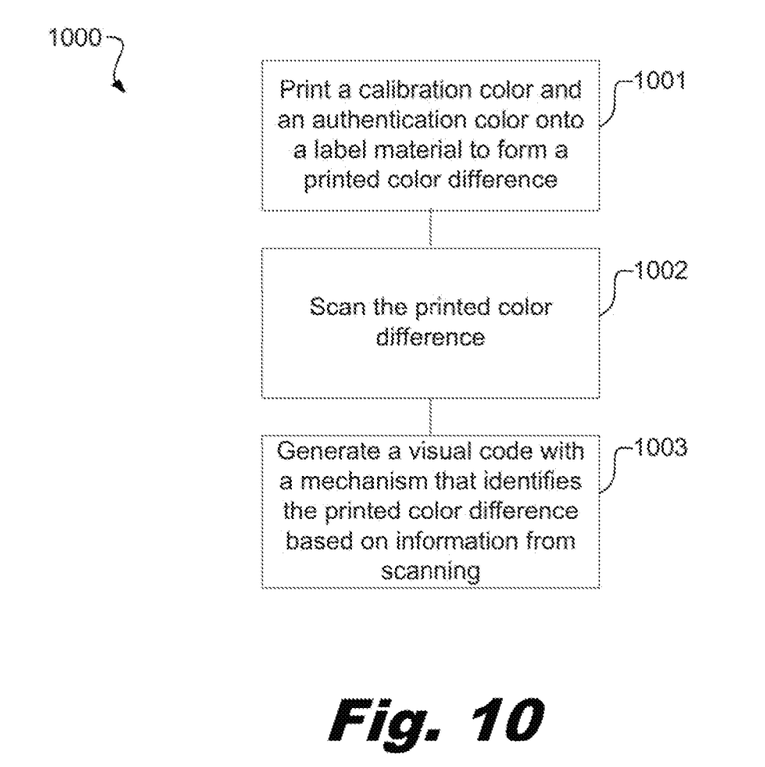
FIG. 10 is a flowchart of an illustrative method for creating an identification mark, according to principles described herein.

FIG. 10 is a flowchart of an illustrative method (1000) for creating an identification mark, according to principles described herein. A calibration color and a predetermined authentication color may be printed (1001) onto a label material to form a printed color. The printed colors may be scanned (1002) and the actual color difference of the colors may be determined. In some examples, the label material may provide a second calibration color. A visual code may be generated (1003) that includes a mechanism to identify the actual difference of the printed colors based on the scan. In some examples, a party that prints the identification mark is a certified company for printing identification marks that conform to the principles described herein. In some examples, these parties may have access to specialized printers that may print colors within tight enough tolerances to print the colors instructed.

Figure 11:
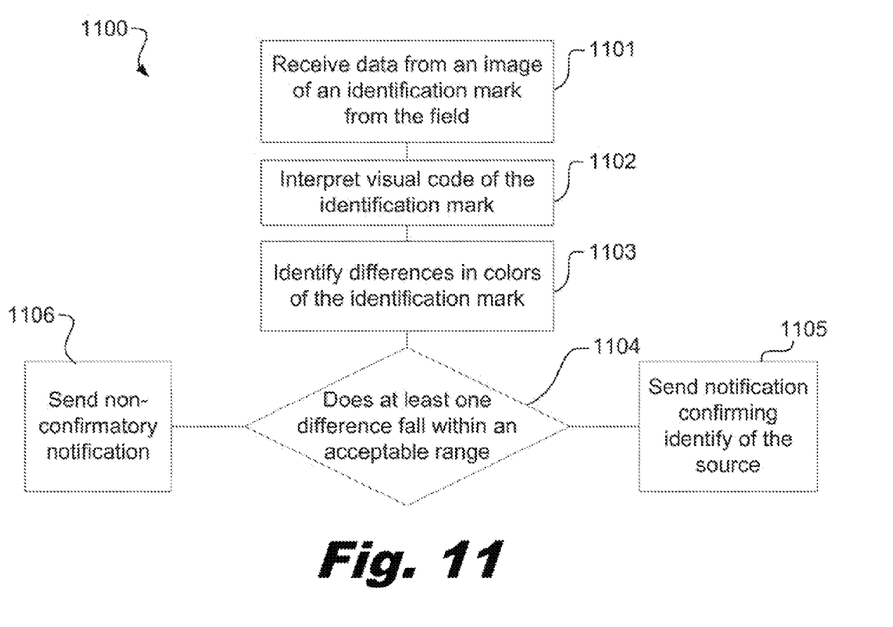
FIG. 11 is a flowchart of an illustrative method for confirming identity of a source, according to principles described herein.

FIG. 11 is a flowchart of an illustrative method (1100) for confirming an identity of a source, according to principles described herein. A device may receive (1101) information from an image of an identification mark that is located in the field. The device may be a field device, a network device, a device located in a networking cloud, or combinations thereof. The device may interpret (1102) the visual code to determine the messages contained therein from the received information. For example, the information may contain the colors and/or their respective differences, an address to a location that contains information about the colors and/or their differences, a security mechanism to gain access to such a location, or combinations thereof. The security mechanism may a pass code, a symbol that is part of a nonce, a token, other security mechanism, or combinations thereof.

The device may identify (1103) the difference between the colors through its access to a location containing the information, through interpreting the visual code, or combinations thereof. The device may determine (1104) if the differences between the colors contained in the received information or derived from the received information fall within a predetermined acceptable range of color difference. If the color difference falls within the acceptable range the device may send (1105) a notification that confirms the identity of the source. If the color difference falls outside of the predetermined acceptable range, the device may send (1106) a non-confirmatory notification.

In some examples, the device first identifies the calibration colors to determine the axis they define within a three dimensional color space. Then the device may identify the predetermined authentication color and its respective coordinates within the three dimensional color space. Next, the device may determine the direction, distance, and spatial area of the predetermined authentication color's coordinates with respect to any of the calibration colors or the axes defined in-between. The device may authenticate the identification mark if these parameters fall within the predetermined acceptable difference range.

In some examples, the difference range is broad, allowing for less precision in printing the identification marks. In some examples, a single calibration color and a predefined substrate color may be used and the predetermined color difference may account for a predetermined amount of spatial error in any direction from the calibration color. In some examples, the spatial error and direction need to be satisfied for authentication. Further, in some examples, multiple calibration colors are used. In other examples, the color difference range may be narrower and/or used multiple parameters, which may increase the level of security provided by the identification mark.

In some examples, the device may send alternative notifications. For example, notification may provide the field device operator with instructions, such as to look for another identification mark at another location on the packaging or inform authorities that the mark is a counterfeit. Another alternative notification may include identifying the product or giving information about which product should correspond to the identification mark. In some examples, no notification may be sent if the mark fails to authenticate to comply to with regional laws or preferences.

In some examples, a combination of identification marks may be used per product or package to provide a greater level of security. Further, the identification mark may have a plurality of layers that may be successively removed, each with colors for authentication. In some examples, the visual code and the colors may be located in difference spots on the packaging or product. In such an example, a visual code may be affixed to the outside of the packaging while one of the colors is located on the inside of the packaging.

In some examples, tamper resistant mechanisms may be employed to prevent tampering with the identification mark. An example of a tamper resistant mechanism may include a peel away cover over the identification mark. Also, an identification mark may be placed on the inside of packaging or in a hidden location to prevent tampering. In some examples, a peel away cover may be non-reusable. In some examples, the tamper resistant mechanism may be employed so that a single scan is allowable, such as at the cashier or custom check point.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for confirming an identity of product source, comprising:
    receiving information derived from an image of an identification mark associated with a product, said identification mark comprising at least two differing calibration colors, at least one predetermined authentication color, and a visual code; and
    determining if a color coordinate of said predetermined authentication color in a three dimensional color space is within an acceptable range by using said calibration colors and information in said visual code.

2. The method of claim 1, wherein receiving an image of an identification mark, said identification mark comprising at least two calibration colors, at least one predetermined authentication color, and a visual code includes receiving said image by a component of a field device.

3. The method of claim 1, wherein receiving an image of an identification mark, said identification mark comprising at least two calibration colors, at least one predetermined authentication color, and a visual code includes receiving said image by a component of a network device from a field device.

4. The method of claim 3, wherein said field device is a camera, a mobile device, a phone, a fixture, or combinations thereof.

5. The method of claim 1, wherein said range is a hue range, lightness range, luminance range, colorfulness range, chrome range, saturation range, or combinations thereof.

6. The method of claim 1, further comprising notifying a field device that said product source is authentic when said color coordinate falls within said acceptable range.

7. The method of claim 1, wherein said visual code includes a network resource identifier.

8. The method of claim 1, wherein:
said calibration colors are coordinates within said three dimensional color space and said calibration colors define an axis within said three dimensional color space, and said coordinate of said predetermined authentication color has a spatial error from said axis that is within a predetermined range; and
when said predetermined authentication color is within said predetermined range, the method further comprises notifying an operator that the source of the product is authentic.

9. The method of claim 1, wherein said predetermined authentication color and said calibration colors are positioned at a predetermined location in said identification mark.

10. The method of claim 1, wherein determining if a color coordinate of said predetermined authentication color in a three dimensional color space is within an acceptable range by using said calibration colors and information in said visual code comprises:

determining a difference between said at least two calibration colors and said at least one predetermined authentication color;
interpret said visual code to determine an acceptable difference range; and
when said difference is within an acceptable difference range, verify that said product is authentic.

11. The method of claim 1, wherein determining if a color coordinate of said predetermined authentication color in a three dimensional color space is within an acceptable range by using said calibration colors and information in said visual code is performed at a field device.

12. A method for forming an identification mark to confirm an identity of a product source, comprising:
printing a calibration color and an authentication color onto a label material, said calibration color and said authentication color having a printed color difference;
scanning said calibration color and said authentication color to determine said printed color difference; and
generating a visual code comprising a mechanism that identifies said printed color difference based on information from said scanning of said calibration color and said authentication color.

13. The method of claim 12, wherein said label material comprises a second calibration color.

* * * * *

UNITED STATES PATENT AND TRADEMARK OFFICE
CERTIFICATE OF CORRECTION

PATENT NO. : 9,773,168 B2
APPLICATION NO. : 14/347329
DATED : September 26, 2017
INVENTOR(S) : Ehud Chatow It is certified that error appears in the above-identified patent and that said Letters Patent is hereby corrected as shown below:

In the Drawings

Fig 11, Reference number 1105, delete "identify" and insert --identity--, therefor.

In the Claims

In Column 12, Line 1, Claim 1 delete "of product" and insert --of a product--, therefor.

In Column 13, Line 3, Claim 5 delete "chrome" and insert --chroma--, therefor.

Signed and Sealed this
Twentieth Day of February, 2018

Andrei Iancu
*Director of the United States Patent and Trademark Office*